United States Patent Office 2,793,928
Patented May 28, 1957

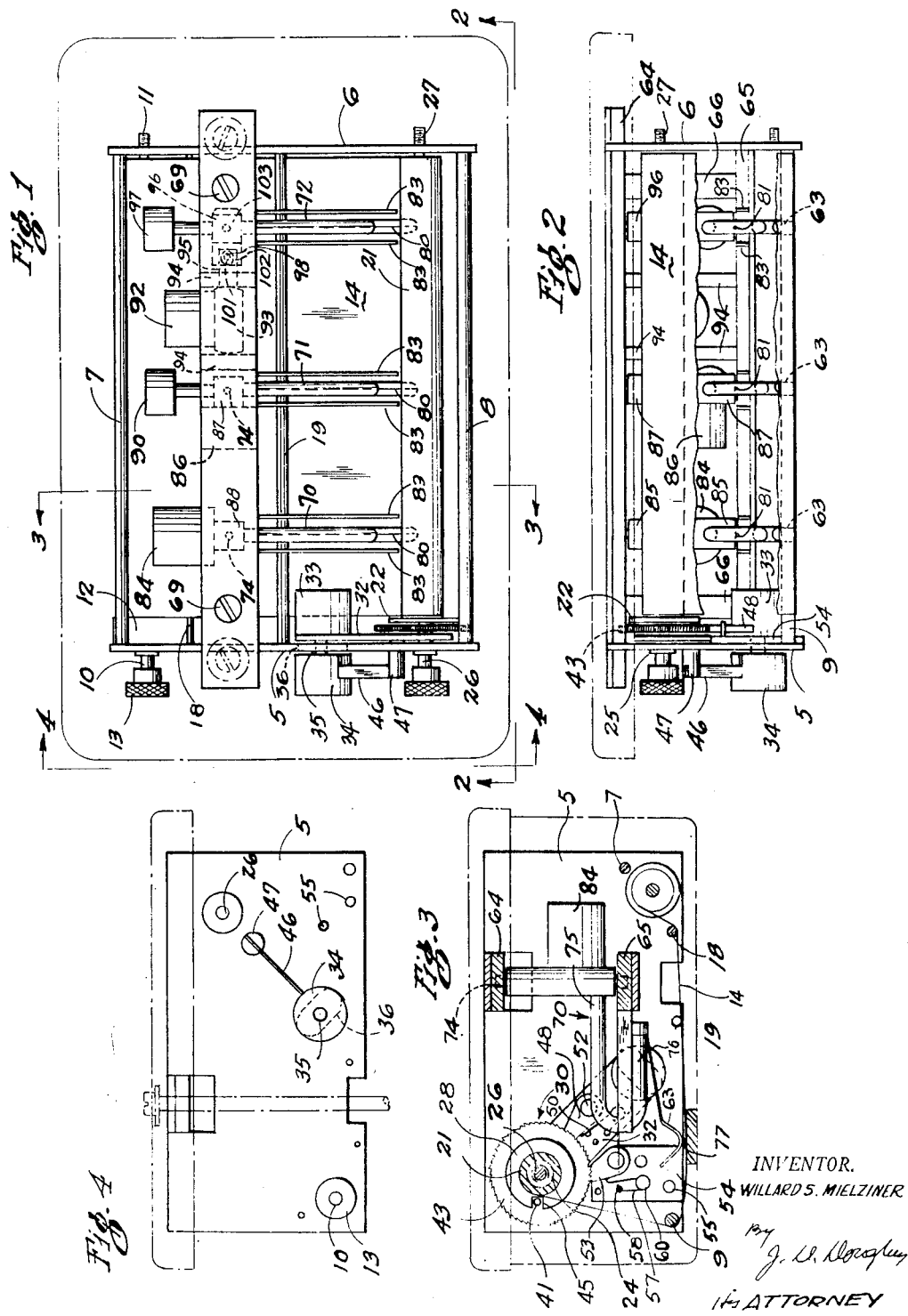

2,793,928

RECORDING DEVICE

Willard S. Mielziner, Cleveland, Ohio

Application June 1, 1954, Serial No. 433,408

1 Claim. (Cl. 346—136)

This invention relates to recording devices and more particularly to an improvement in a recorder for measuring the magnitude of a force in any direction.

In devices of this kind, there is usually provided a plurality of pendulums, each being operable in a different plane, and having some means such as a stylus whereby the relative movement of each pendulum is recorded on a moving tape.

It is necessary therefore to provide some means to move the tape over the stylus assembly so that the magnitude, direction and time of occurrence of the force or forces acting thereupon can be accurately recorded.

Heretofore, various methods that have been used included a revolvable drum attached to a spring mechanism similar to that found in a timing piece, which required re-winding periodically. Another method used was a small electric motor attached to the revolvable drum, and which required an electrical source located external to the unit, or provision had to be made to include a source of electrical power within the unit.

As a result therefore, the recording device has become increased in size, and more intricate in construction.

By my invention I provide a tape drive unit that is compact yet simple in operation, and operable to provide varying paper speeds depending upon the intensity of impact of the force or forces acting thereupon. The latter feature is very desirable when there are intense forces acting in each of the longitudinal, vertical and lateral planes because, as the magnitude of the forces increase, the speed of the tape traveling under the stylus increases which spreads out the sinusoidal force waves so that a highly accurate calibration thereof can be made.

Other advantages of my invention, and the invention itself will become apparent upon reference to the following drawings which form a part of this specification.

Fig. 1 is a bottom plan view of a recording device showing one embodiment of my invention;

Fig. 2 is an elevational view taken on line 2—2 of Fig. 1;

Fig. 3 is an elevational sectional view taken on line 3—3 of Fig. 1;

Fig. 4 is an elevational side view taken on line 4—4 of Fig. 1.

Briefly my invention comprises a recording apparatus mounted upon a frame and includes a set of pendulums each carrying a stylus in constant engagement with a paper tape that records the magnitude of the forces acting upon the device. A pendulum operated drive unit furnishes the rotary motion for the paper tape roll, and is adapted to change the speed of which the paper tape passes under the stylus arms depending upon the force of the impact intercepted by the apparatus. Each stylus is mounted on the frame in such manner as to be swingable in a direction perpendicular to the force applied to each pendulum. A spring assembly is associated with each pendulum, and is adapted to return each pendulum to its neutral position after having been deflected by a force or forces.

More specifically and with reference to the drawings, my invention comprises a set of vertical end plates 5 and 6, Fig. 1, which are held in a pre-determined spaced relationship by elongated rods 7, 8 and 9 which are disposed in openings in each plate, with the ends thereof peened over or spread out to prevent their removal.

A shaft 10 having threads 11 on one end, is placed through a hole in plate 5, passing centrally through a boss 12 secured to the inside of said plate, and is threaded into the opposite vertical plate 6. A knurled head 13 may be formed on the end of the shaft opposite the threaded end to facilitate placing said shaft into its position.

The paper roll tape 14, preferably of the variety which is treated so that a simple stylus will mark it without need of pencil or ink, is wound about the shaft 10, and the completed assembly is called the supply roll.

The supply roll is placed within the frame and the paper is extended from the supply roll, under an adjacent guide pin 18, over a second guide pin 19, around the outside of the rod 9 to a cylindrical take-up roller 21. The tape may be either secured to the roller 21 or merely wrapped about its periphery.

A flange 22 is located on one end of the roller 21, and is adapted to space the paper centrally within the recorder. A boss 24, Fig. 3, of the flange 22 extends within the roller and provides a bearing surface for said roller on a shaft 26. The shaft 26 has a threaded end 27 which is inserted into a bushing 25 rigidly secured to plate 5, and is passed through the driving gear mechanism 30, Fig. 3, into and through the central portion of the roller 21, and is threaded into the opposite plate 6. This shaft provides the base upon which the take-up roller 21 is rotatable.

The drive mechanism 30, Fig. 3 is drivingly coupled to the take-up roller 21 by means of a pin 41 that extends from the inner face of the drive gear 43, into a rectangular slot 45 in the flange 22 on the end of the roller.

The main drive gear 43 is rotatably secured to the vertical plate 5 by means of a flange 28 integral with the bushing 25 and which is disposed into a countersunk hole located centrally in the inner surface of the gear.

A rocker arm 32 is rotatably journalled on the bushing 25 between the main gear 43, and the plate 5. A weight is attached to the free end of the rocker arm and comprises two cylinders. One cylinder 33 is attached directly to the surface of the rocker arm, while the remaining cylinder 34 is located on the outside of the vertical plate 5, and attached to said rocker arm by a longitudinal pin 35, extending from the center of cylinder 34, through a slot 36 in the plate 5, through a hole in the rocker arm 32, and into the center of the cylinder 33.

The slot 36 is placed in the plate 5 in the area where the pin extends therethrough allowing the rocker arm and attached weights to have a limited amount of rotation about the bushing 25 as one integral mass with a pendulum type motion. A leaf spring 46, Figs. 1 and 2, rigidly attached to the plate 5 by a stud 47 is fastened to the cylinder 34, and maintains the rocker arm assembly centrally within the slot.

A drive pawl 48, Fig. 3, is pivotally attached to the rocker arm by a pin 52, and a series of teeth are formed on the free end thereof, which engage with the teeth on the main gear 43. The drive pawl 48 is held in spring pressed engagement with the main gear 43 by a spring 50 having one end anchored to the rocker arm, and the other end in abutting relationship with one side of the drive pawl to rotate the drive pawl clockwise about its pivot 52.

The drive pawl is engageable with the main gear 43 at a point slightly to the left of an imaginary axial line connecting the pivot of the drive pawl 48 and center of the drive gear 43, thereby preventing the spring from rotating the drive pawl clockwise, free of its meshing engagement with the gear.

A stop pawl or finger 53 similar in construction to the drive pawl is pivotally mounted on a plate 54 which in turn is rigidly secured to the vertical plate 5 by rivets 55. A spring 57, having one end seated within a hole 58 in the plate 5, and the approximate middle portion of the spring wrapped around a stud 60 thereby creating a pre-load or tension, and the opposite end in engagement with the stop pawl 53, presses said pawl into meshing relationship with the drive gear 43. The stop pawl is adapted to prevent the drive gear from backing up once it has been rotated clockwise by the drive pawl 48.

The pendulum recording arms each carrying a recording stylus 63 are mounted between two elongated rectangular metallic plates. The top plate 64 Fig. 3, may be composed of two thin strips of metal superimposed upon one another. The bottom plate 65 may be similarly constructed, and each plate is held in spaced relationship by means of vertical posts 66 Fig. 2 held in place by means of countersunk screws 69 Fig. 1 extending through each plate and into threading engagement with the posts.

My device is capable of measuring impulses from any of three directions or the resultant combination thereof. For simplicity of explanation each pendulum arm is indentified by the type of impulse it is adapted to measure. Pendulum arm 70, Fig. 1, is to be hereafter referred to as the "longitudinal force" arm; pendulum arm 71 is to be referred to as the "lateral force" arm; and pendulum arm 72 is to be referred to as the "vertical force" arm. Each force arm is mounted between the top and bottom plates 64 and 65 by means of a vertical rectangular shaft having pin means 74 on either end thereof rotatably journalled in holes in said plates. The construction of each arm is substantially U-shaped in form having one longer leg 75 rigidly attached to the shaft, and a shorter leg 76 carrying the stylus. The stylus is formed of stiff wire or a strip of resilient metal bent to the shape shown having a rounded point 77 for engaging the treated paper and placing a mark thereon.

In order that the pendulum arms respond instantaneously to the forces acting thereon, weights are attached to each arm assembly, and are mounted so that they move only in a direction parallel to the forces applied. The pendulum type motion is obtained by having the center of gravity of each weight displaced from its axis of rotation on a line perpendicular to the direction of the force. In determining the mass of the weight and the configuration thereof, the weight of the force arm and the distance its center of gravity is located from the pivot pin 74 must be considered.

The longitudinal force arm 70 has its weight 84 attached to the vertical shaft 85 on the side opposite to the force arm whereby forces acting parallel to the longitudinal axis of the device are capable of deflecting the arm and effecting a recording of the deflection.

The lateral force arm 71 has its weight 86 secured to the vertical shaft 87 on the side adjacent the force arm 71. A counterweight 90 is also secured to the shaft on the side opposite the force arm, whose moment about the pivot 74 is equal and opposite to the moment of the force arm about the pivot, thereby nullifying any effect that a longitudinal force may have on the force arm which would tend to move it in proportion to its magnitude, whereby a false reading would be recorded.

The weight 92 of the vertical force arm 72 is secured to a shaft 93 that is rotatably supported between two posts 94, and an arm 95 of said shaft which extends through and beyond one of said posts toward the vertical shaft 96. A pin 98 is placed in the arm 95 and has a ball 101, shown dotted in Fig. 1, attached thereto and which is seated in a rectangular slot 102 formed in an arm 103 attached to the shaft 96. Any external force acting upon the weight 92 will cause the shaft 93 to rotate, and the ball and socket connection will rotate the shaft 96 about the pivot 74 and thereby move the force arm 72 and attached stylus 63 proportionally. A counterweight 97 is also secured to the shaft 96 on the side opposite the force arm, whose moment about the pivot 74 is equal and opposite to the moment of the force arm about its pivot, thereby nullifying any effect that a lateral force may have on the force arm which would tend to move it in proportion to its magnitude, whereby a false reading would be recorded.

A centering spring 80 Fig. 1 acts to hold each force arm in a central or neutral position. This spring may be constructed from a length of thin wire, one end of which is secured to the bottom plate 65, and the opposite end extending freely through a hole 81 Fig. 2 placed in the curved portion of each arm.

Secondary springs 83 are placed adjacent and parallel to each arm in spaced relation thereto, with one end of each spring imbedded in the bottom plate 65 thereby giving said spring members a cantilever type action.

For measuring impacts of small magnitude, the force arms move against the resistance of the centering spring only, and because of the low modulus thereof, the measurement is substantially a direct relationship to the force of the impact.

When impacts of greater magnitude are impressed upon the device, each arm effected moves first against the resistance of the centering spring 80, and as the oscillation becomes greater, the arms strike the secondary springs 83 adjacent thereto, therefore the displacement of the arms is dependent upon the combined spring moduli of the centering and secondary springs. By selecting material for the centering springs having a low value of spring modulus, and material for the secondary springs having a relatively high value of spring modulus, the resultant combination can be calibrated whereby the recording mechanism is capable of accurately measuring impacts within a range of values, that prior to the applicant's device, were not capable of being detected and recorded.

In operation, the device is installed in the article or vehicle upon which the impacts subjected thereto are to be measured. Upon the device being subjected to a force or forces, the impact thereof will cause the pendulum arm 32 to oscillate within the confines of the slot 36 thereby rotating the gear 43, and move the tape 14 under the stylus arms 64.

It will be noted that the angle of inclination of the pendulum arm 32 is such that forces acting perpendicularly or laterally thereto, tend to actuate the arm and that only forces acting longitudinally thereto fail to actuate it, thus the movement of the arm continuously advances the paper as long as there is vibrations in these directions.

As is most often the case, the force is of a complex nature and is composed of longitudinal, vertical and lateral components, and since each pendulum force arm is constructed so that it is oscillatory upon receiving a force in only one plane, the magnitude of said complex force is broken up into the above mentioned components whereby they are each intercepted and recorded by their respective pendulum force arm. The resultant magnitude of the force being measured can then be determined by the addition of said components vectorially.

The device is also adapted to show whether it remains in its original position throughout the duration of a recording period. The hole 81 in the end of each force arm is slightly larger in diameter than the centering spring 80, and if the device is tilted each arm will move slightly in the same direction that the device is shifted and will thereby establish a new neutral position for the stylus. As long as the device remains in the tilted position, the force arms will oscillate about the displaced neutral axis. The relative distance between any pair of neutral axes as indicated on the tape is proportional to the degree of tilt or displacement of the device from its original position.

It is apparent therefore that my device is capable of accurately detecting and recording any impact of a complex nature, while the mechanism necessary to carry out the desired function is of simple but yet novel construction.

Having thus described but one embodiment of my invention, I am aware that numerous and extensive departures may be made therefrom without departing from the scope and spirit of my invention.

I claim:

An impact recording device including a frame, a storage roll for recording tape disposed in said frame and a take-up roll mounted in the frame for receiving and pulling the tape from the storage roll, means for driving the take-up roll comprising a ratchet gear coaxially mounted on the take-up roll for driving the same and means energized by vibration for driving the ratchet gear comprising a pendulum extending alongside said frame having a pivot point coaxial with the ratchet gear, pawl means carried by the pendulum and engaging the ratchet gear, said pendulum having a shaft carried thereby near its end and a pair of weights spaced from said pivot point and on each side of said pendulum carried by the shaft, said shaft being disposed in a slot in said frame, said shaft being movable within the slot and its movement limited by the ends of the slot.

References Cited in the file of this patent
UNITED STATES PATENTS

| | | |
|---|---|---|
| 1,104,250 | Dake et al. | July 21, 1914 |
| 1,657,935 | McElroy | Jan. 31, 1928 |
| 2,578,803 | Holmberg | Dec. 18, 1951 |